United States Patent
Newman

(10) Patent No.: US 7,952,385 B2
(45) Date of Patent: May 31, 2011

(54) TEMPERATURE VARIANCE NULLIFICATION IN AN INRUSH CURRENT SUPPRESSION CIRCUIT

(75) Inventor: Ethan Beck Newman, Atascadero, CA (US)

(73) Assignee: Rantec Power Systems, Inc., Los Osos, CA (US)

( * ) Notice: Subject to any disclaimer, the term of this patent is extended or adjusted under 35 U.S.C. 154(b) by 0 days.

(21) Appl. No.: 12/938,258

(22) Filed: Nov. 2, 2010

(65) Prior Publication Data

US 2011/0043951 A1 Feb. 24, 2011

Related U.S. Application Data

(63) Continuation of application No. 12/368,273, filed on Feb. 9, 2009, now Pat. No. 7,830,168.

(51) Int. Cl.
*H02H 9/00* (2006.01)
*H03K 17/16* (2006.01)

(52) U.S. Cl. .............................................. 326/32; 361/58
(58) Field of Classification Search ................ 326/32, 326/82; 361/58, 18, 93.9; 327/432; 323/222; 363/53
See application file for complete search history.

(56) References Cited

U.S. PATENT DOCUMENTS

| 7,030,680 | B2 * | 4/2006 | Metzler ......................... 327/427 |
| 2009/0284302 | A1 * | 11/2009 | Hu et al. ........................ 327/427 |
| 2009/0284303 | A1 * | 11/2009 | Hu et al. ........................ 327/434 |

* cited by examiner

*Primary Examiner* — Daniel D Chang
(74) *Attorney, Agent, or Firm* — Hickman Palermo Truong & Becker LLP

(57) ABSTRACT

The temperature dependence of an inrush current suppression circuit comprising a MOSFET having an input terminal coupled to a direct current input voltage can a transistor electrically coupled to the MOSFET can be reduced by matching the temperature coefficient of a transistor to a component electrically coupled to the transistor.

17 Claims, 4 Drawing Sheets

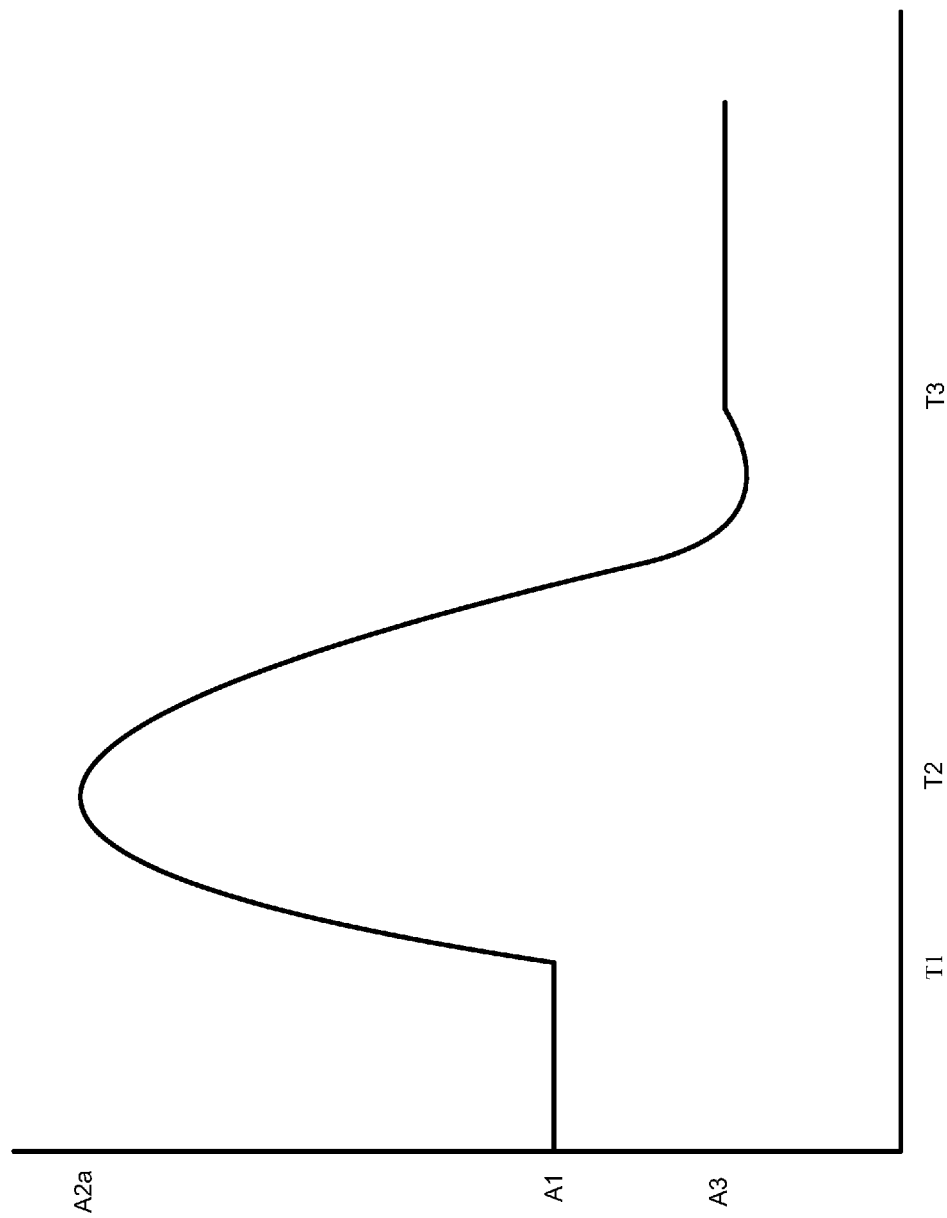

TEMPERATURE VARIANCE NULLIFICATION IN AN INRUSH CURRENT SUPPRESSION CIRCUIT

CLAIM OF PRIORITY

This application claims domestic priority under 35 U.S.C. §120 as a Continuation of prior U.S. patent application Ser. No. 12/368,273 now U.S. Pat. No. 7,830,168, filed on Feb. 9, 2009, the entire contents of which are hereby incorporated by reference as if fully set forth herein.

FIELD OF THE DISCLOSURE

The present disclosure relates generally to power converter circuits and relates more particularly to inrush current suppression circuitry for DC to DC and AC to DC converters.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

In electrical systems ranging in size from small portable electronic devices to large industrial machinery it is common for different components in a system to operate at different voltage levels. In order for those different components to operate off of a common power supply such as a battery or generator, components operating at different voltages must be connected to the power source through a power converter, such as a direct current (DC) to DC converter or an alternating current (AC) to DC converter. Power converters also improve the interchangeability and scalability of components by eliminating the need for every component to have its own, customized power source.

Inrush current suppression circuitry currently known in the art has undesirable temperature variance, and depending on the application utilizing the power converter, the power converter might need to operate under conditions ranging from below −55° C. to above 95° C. This wide range of operating temperatures greatly limits the extent to which inrush current can be suppressed. For example, inrush current suppression circuitry known in the art for a typical DC-to-DC power converter operating at steady state currents of between 4 and 5 amps might be able to limit inrush current to 15 amps, but it is often desired to limit inrush current to much lower amounts, such as 8.5 amps. Achieving this combination of narrow current ranges and widely varying operating temperatures, however, is extremely difficult, if not impossible, with the temperature-dependent inrush current suppression circuitry known in the art.

BRIEF DESCRIPTION OF THE DRAWINGS

The present invention is illustrated by way of example, and not by way of limitation, in the figures of the accompanying drawings.

FIG. 2a shows a graph of inrush current in the absence of inrush current suppression circuitry.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
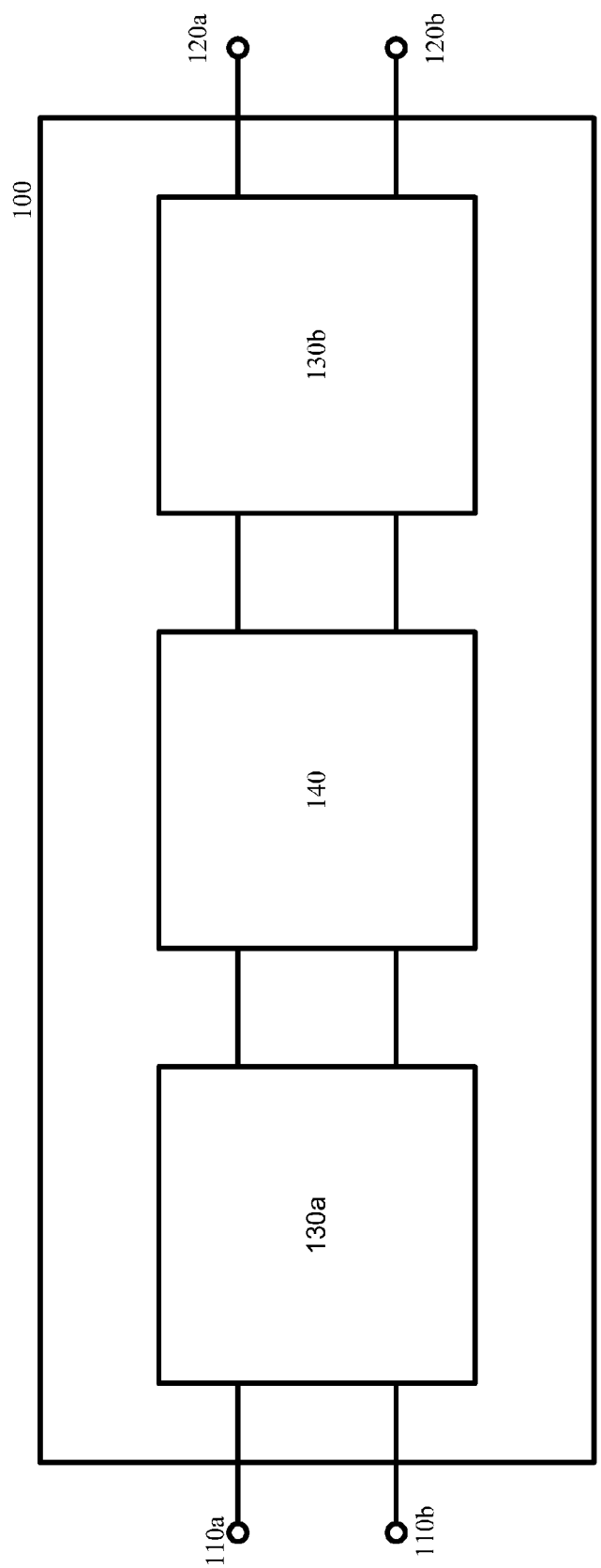
FIG. 1 shows a block diagram of a power converter.

FIG. 1 is a schematic of a power converter 100 such as a DC-to-DC power converter. The power converter 100 can receive a differential input voltage at first inputs 110a-b of a power bus from a power source such as a battery or generator, and output a different differential voltage to a load at outputs 120a-b. The converter contains various types of conditioning circuitry 130a-b for purposes such as raising or lowering the voltage, eliminating noise, and implementing various safety features.

When the input voltage at the inputs 110a-b is constant or near constant, the components of the conditioning circuitry 130a-b operate in a steady state, and the input current of the power converter 100 will either be constant or only slightly vary. When the power converter 100 experiences a line transient with a high slew rate, such as when the output voltage of a power source connected to inputs 110a-b suddenly increases, there is a time delay between the time the line transient is first received at the power converter 100 and the time the conditioning circuitry 130a-b returns to steady state operation.

The delay is caused by the time it takes capacitive elements in the conditioning circuitry 130a-b to charge in response to the higher input voltage. In a capacitive element, because change in voltage (also called dV/dt or slew rate) is proportional to change in current, the capacitive elements will begin pulling large amounts of current from the power source until the capacitor is charged, at which time a steady state current is reached. During the time the capacitive elements are charging, the input current will suddenly and temporarily spike before returning to a constant or near constant value. Many times, the current during such a spike will be 10 to 20 times greater than the steady state current.

FIG. 2a shows a graph of input current at the power converter 100 during the time of a line transient. Prior to time T1, the input current is constant at a value of A1. At time T1, the line transient occurs and the incoming current spikes to A2a by time T2 before returning to A3 at time T3. The spike in current to A2a at time T2 might be damaging to power sources connected to the inputs 110a-b or to devices connected to the outputs 120a-b of the power converter 100.

Figure 2B:
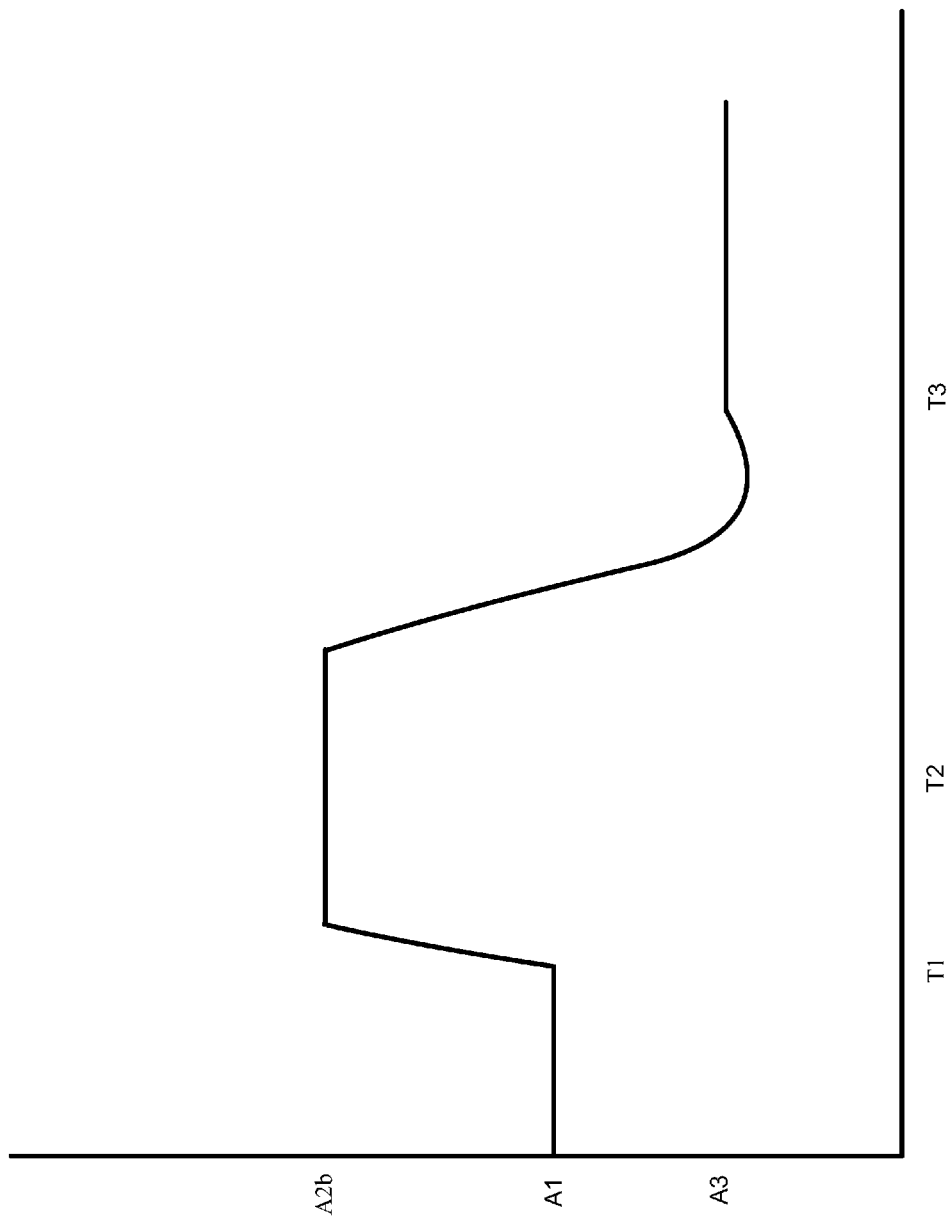
FIG. 2b shows a graph of inrush current in a system with inrush current suppression circuitry.

In order to suppress the spike in current, the power converter 100 can further comprise inrush current suppression circuitry 140 to prevent the input current spike shown in FIG. 2a. By including the inrush current suppression circuitry 140, the input current can be suppressed to a lower level, such as A2b as shown in FIG. 2b.

Inrush current suppression circuitry currently known in the art has undesirable temperature variance, and depending on the application utilizing the power converter, the power converter might need to operate under conditions ranging from below −55° C. to above 95° C. This wide range of operating temperatures greatly increases the total circuit tolerance and thus required additional window between the maximum steady state current level and maximum allowable peak inrush current level. For example, inrush current suppression circuitry known in the art for a typical DC-to-DC power converter operating at a steady state current of 5 amps might have ±4 A of variation in the current limit threshold and thus must be set to a nominal current limit point of at least 9 amps (which would allow it to vary to as much as 13 A) to avoid tripping during steady state operation, but it is often desired to limit inrush current to much lower amounts, such as 8.5 amps. Achieving this combination of narrow current ranges and widely varying operatings, however, is extremely difficult, if not impossible, with the temperature-dependent inrush current suppression circuitry known in the art. Therefore, there exists in the art a need for inrush current suppression circuitry that is less affected by changes in temperature.

Figure 3:
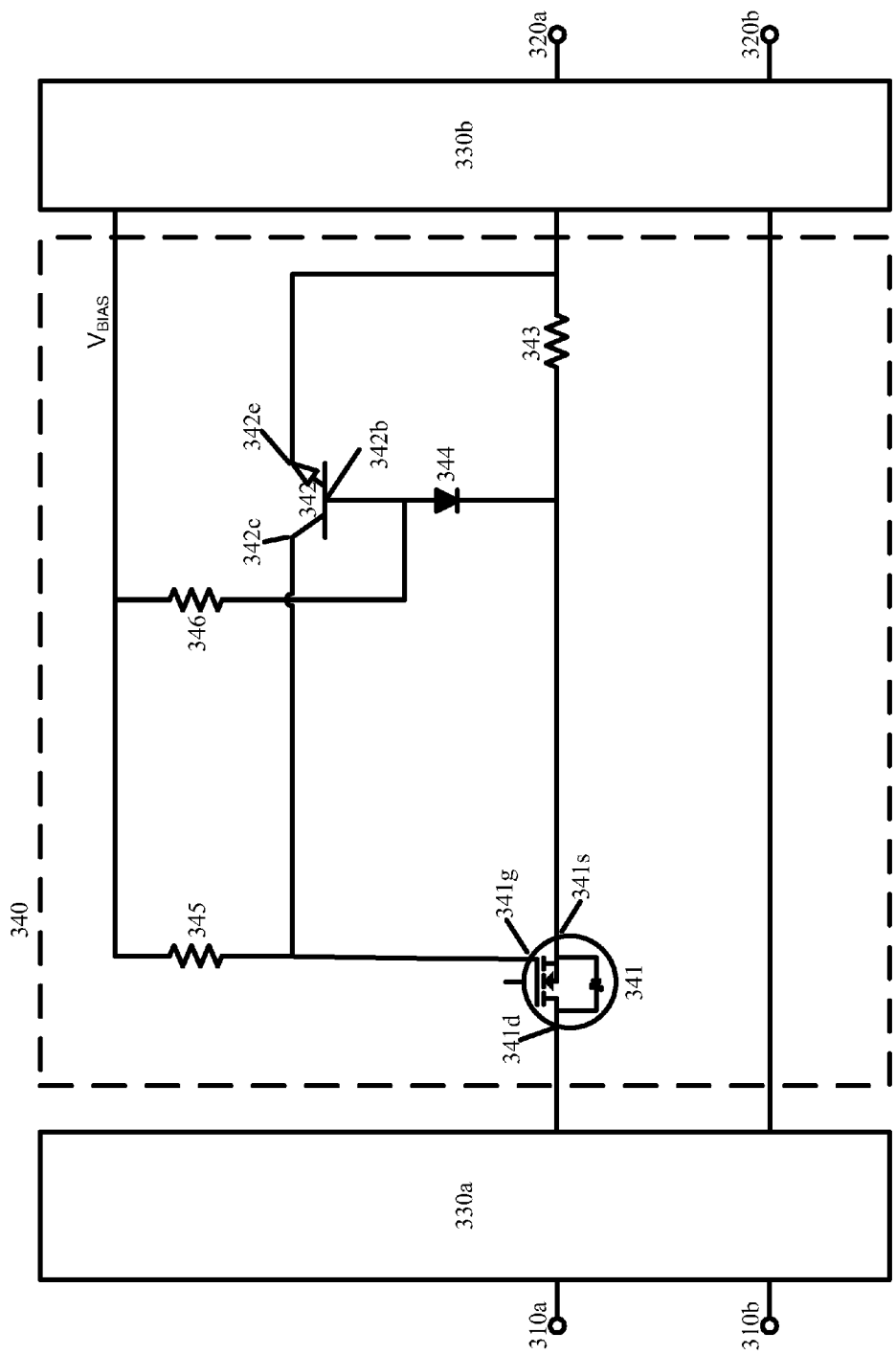
FIG. 3 shows a block diagram of a power converter implementing inrush current suppression circuitry in an embodiment.

FIG. 3 shows a power converter device containing inrush current suppression circuitry 340, in one embodiment. The power converter can receive a differential input voltage at first inputs 310a-b from a power source such as a battery or generator, and output a different differential voltage to a load at outputs 320a-b. For example, the input voltage might be 270V, and the output voltage might be 12V. The converter contains various types of conditioning circuitry 330a-b such as for raising or lowering the voltage, eliminating noise, and implementing various safety features.

The power converter of FIG. 3 further comprises inrush current suppression circuitry 340. In an embodiment, inrush current suppression circuitry 340 includes a metal-oxide-semiconductor field-effect transistor (MOSFET) 341 with a drain 341d, a gate 341g, and a source 341s. The drain 341d of the MOSFET 341 can be coupled through conditioning circuitry 330a to a power source such as a generator, and the gate 341g of the MOSFET 341 can be connected through a resistor 345 to a bias voltage $V_{BIAS}$, such as 12V for example. When the gate-to-source voltage of the MOSFET 341 drops below a threshold level (referred to hereinafter as the plateau voltage), the MOSFET 341 will enter the linear region of operation wherein the drain-to-source impedance will begin increasing, and the MOSFET 341 can be used as a variable resistor.

Once the MOSFET 341 enters its linear region, the drain-to-source impedance of the MOSFET 341 can be used to create a voltage drop over the inrush current suppression circuitry 340, i.e. between 330a and 330b. Due to the voltage drop, the components comprising conditioning circuitry 330b will not draw as much current from the power source connected to inputs 310a-b.

By controlling the gate-to-source voltage of the MOSFET 341, the voltage drop over the MOSFET 341 can be adjusted as a function of the amount of inrush current at inputs 310a-b, such that once the gate-to-source voltage is below the plateau voltage, increased amounts of in rush current will cause a higher drain-to-source impedance and hence a higher drain-to-source voltage drop.

To control the gate-to-source voltage of the MOSFET 341, the active inrush current suppression circuitry 340 further comprises a transistor 342, such as a bipolar junction transistor (BJT), with a collector 342c, an emitter 342e, and a base 342b. The collector 342c of the transistor 342 is electrically coupled to the gate 341g of the MOSFET 341. The transistor 342 is a non-linear device and can draw little or no current into the collector 342c when the base-to-emitter voltage ($V_{BE}$) of the transistor 342 is below a $V_{BE}$ threshold voltage but can begin drawing a large amount of current into the collector 342c when $V_{BE}$ exceeds that $V_{BE}$ threshold voltage. The $V_{BE}$ threshold voltage can be a low voltage relative to the input voltage. For example, the input voltage might be 270V, and the $V_{BE}$ threshold voltage might be 0.7V at room temperature.

The base 342b of the transistor 342 can be electrically coupled to the emitter 342e of the transistor 342 by a resistive element such as a resistor 343 (also referred to as $R_{SENSE}$ 343) and another component, such as a Schottky diode 344, connected in series. Thus, in the embodiment of FIG. 3, $V_{BE}$ will be the voltage drop over $R_{SENSE}$ 343 and the Schottky diode 344.

The value of $R_{SENSE}$ 343 can be chosen to be relatively low compared to the resistance caused by the MOSFET 341 when it is operating in its linear region, such that under a line transient condition, the majority of the voltage drop caused by the inrush current suppression circuitry 340 will be caused by the MOSFET 341 and not $R_{SENSE}$ 343.

The resistance of $R_{SENSE}$ 343 can additionally be chosen such that in steady state operation the voltage drop over $R_{SENSE}$ 343 and the Schottky diode 344 will be below the $V_{BE}$ threshold value. Under a line transient condition, however, the voltage drop across $R_{SENSE}$ 343 and the Schottky diode 344 can increase to above the $V_{BE}$ threshold voltage, causing the transistor 342 to start conducting current into the base 342b. When the transistor 342 conducts current into the base 342b, an amplified amount of current will be drawn into the collector 342c. The current drawn into the collector 342c will have an amount of gain, such as a factor of 10 to 200 depending on the parameters of the transistor 342, relative to the current drawn into the base 342b.

The current drawn into the collector 342c comes primarily from the gate-to-source parasitic capacitance of the MOSFET 341, discharging the gate 341 and thus reducing the gate-to-source voltage. Reducing the gate-to-source voltage to below the plateau voltage can causes the MOSFET 341 to enter its linear region, thus causing the drain-to-source impedance to increase. Therefore, the transistor 342 can be used to create a feedback loop, such that the drain-to-source impedance of the MOSFET 341 is a function of the amount of current through $R_{SENSE}$ 343.

Transistors currently known in the art frequently have significant temperature coefficients associated with their base-to-emitter threshold voltages, such that the $V_{BE}$ threshold voltage will typically vary −2 mV/° C. Therefore, the $V_{BE}$ threshold voltage for a device operating over a temperature range of −45° C. to +95° C. might vary by as much as 0.3V, which is significant considering that $V_{BE}$ threshold voltages tend to be relatively small, such as 0.7V.

In order to offset this temperature variance in the transistor 342, embodiments of the present approach include coupling another component, such as a Schottky diode 344, in series to $R_{SENSE}$ 343, such that the $V_{BE}$ of the transistor 342 is the voltage drop over both the Schottky diode 344 and $R_{SENSE}$ 343. The Schottky diode 344 can be chosen such that its temperature coefficient is similar to the transistor's 342 temperature coefficient. For example, if the temperature coefficient of the transistor 342 is approximately −2 mV/° C., then a Schottky diode with a temperature coefficient of approximately −2 mV/° C. might also be chosen.

The Schottky diode 344 can be coupled to the base 342b of the transistor 342 and through a resistor $R_{BASE}$ 346 to $V_{BIAS}$. The resistance of $R_{BASE}$ 346 and the parameters of the Schottky diode 344 can be chosen such that the Schottky diode 344 will have a low forward voltage drop. For example, at room temperature the forward voltage drop over the Schottky diode 344 might be 0.25V. If the room temperature $V_{BE}$ threshold voltage for the transistor 342 is 0.7V and the room temperature forward drop over the Schottky diode 344 is 0.25V, then a resistance for $R_{SENSE}$ can be selected such that the voltage drop over $R_{SENSE}$ 343 will be greater than 0.45V at the current level where it is desired that the inrush current suppression circuitry 340 begins suppressing the inrush current, also referred to as the current limit point. When the current through $R_{SENSE}$ 343 causes a voltage drop across $R_{SENSE}$ 343 of greater than 0.45V then $V_{BE}$, then the combined voltage drop across the Schottky diode 344 and $R_{SENSE}$ 343 will exceed the $V_{BE}$ threshold voltage of 0.7V that causes the MOSFET 341 to enter its linear region, as described above.

At an operating temperature higher than room temperature, such as 95° C., the $V_{BE}$ threshold voltage of the transistor 340 might decrease from 0.7V to 0.55V, for example. If the Schottky diode 344 has a similar temperature coefficient, then at 95° C. its forward voltage drop might decrease by the same or a similar amount, i.e. from 0.25V to 0.1V. If the forward voltage drop of the Schottky diode 344 is 0.1V and the $V_{BE}$ threshold voltage is 0.55V, then a voltage drop of greater than 0.45V across $R_{SENSE}$ 343 is once again the voltage drop that causes the MOSFET 341 to enter its linear region. As resistance does not vary significantly with temperature, the current limit point that causes the voltage drop across $R_{SENSE}$ 343 to exceed 0.45V will also not change significantly.

At an operating temperature significantly lower than room temperature, such as −45° C., the $V_{BE}$ threshold voltage of the transistor 340 might increase from 0.7V to 0.85V. If the Schottky diode 344 has a similar temperature coefficient, then at −45° C. its forward voltage drop might increase by the same or a similar amount, i.e. from 0.25V to 0.4V. If the forward voltage drop of the Schottky diode 344 is 0.4V and the $V_{BE}$ threshold voltage is 0.55V, then once again a voltage drop of greater than 0.45V across $R_{SENSE}$ 343 is necessary for the MOSFET 341 to enter its linear region. As in the instance where the operating temperature is significantly above room temperature, at operating temperatures significantly below room temperature, the voltage drop across $R_{SENSE}$ 343 required for $V_{BE}$ to exceed the $V_{BE}$ threshold voltage remains the same or similar, meaning the current limit point also remains the same or similar.

Although the previous example, presents a scenario where a Schottky diode 344 is used to keep the current limit point and the associated voltage required across $R_{SENSE}$ 343 constant, it will be readily apparent to one skilled in the art that a Schottky diode 344 or other component with a temperature coefficient different than the temperature coefficient of the transistor 342 might also be used to reduce variation of the current limit point as a function of temperature, as opposed to keeping the current limit point constant.

A power converter embodying the techniques herein can be configured to have a steady state current of between 4 amps and 5 amps when coupled to a power source having a voltage of approximately 270V. In response to a line transient with a slew rate of greater than 20V/μs, inrush current suppression circuitry can limit inrush current to less than 9 amps across a temperature range from −55° C. to 95° C.

In this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
a metal-oxide semiconductor field-effect transistor (MOSFET) having an input terminal directly or indirectly electrically coupled to a direct current input voltage;
a transistor electrically coupled to the MOSFET and configured to cause an impedance of the MOSFET to increase in response to a sensed voltage exceeding a threshold voltage, the sensed voltage to increase in response to a rapid increase in input current, wherein the threshold voltage is a low voltage relative to the direct current input voltage;
a component electrically coupled to the transistor, and configured to have a voltage drop that varies as a function of temperature;
wherein the sensed voltage comprises the voltage drop of the component and a voltage drop over a resistive element, the voltage drop of the resistive element to be a function of a current of the direct current input voltage.

2. The apparatus of claim 1, wherein the component is a Schottky diode.

3. The apparatus of claim 1, wherein the component is coupled either directly or indirectly to a base of the transistor and an emitter of the transistor.

4. The apparatus of claim 1, wherein the component is connected in series to a resistor, and the resistor and component couple a base of the transistor to an emitter of the transistor.

5. The apparatus of claim 1, wherein the sensed voltage comprises the voltage drop of the component.

6. The apparatus of claim 1, wherein a base-to-emitter threshold voltage of the transistor has a first temperature coefficient and the component has a second temperature coefficient, and wherein the first temperature coefficient and second temperature coefficient are either both positive or both negative.

7. A circuit comprising:
a MOSFET having an input terminal directly or indirectly coupled to a direct current input voltage;
a transistor coupled to the MOSFET and configured to cause an impedance of the MOSFET to increase in response to a base-to-emitter voltage of the transistor exceeding a threshold voltage, wherein the threshold voltage decreases as temperature increases and is a low voltage relative to the direct current input voltage;
a component electrically coupled either directly or indirectly to the base of the transistor and to the emitter of the transistor, wherein the base-to-emitter voltage comprises a voltage drop across the component, the voltage drop across the component to vary as a function of temperature;
wherein the sensed voltage comprises the voltage drop of the component and a voltage drop over a resistive element, the voltage drop of the resistive element to be a function of a current of the direct current input voltage.

8. The circuit of claim 7, wherein the component is a Schottky diode.

9. The circuit of claim 7, wherein the component is connected in series to a resistor, and the base-to-emitter voltage comprises a voltage drop across the resistor.

10. The circuit of claim 7, the threshold voltage of the transistor has a first temperature coefficient and the component has a second temperature coefficient, and wherein the first temperature coefficient and second temperature coefficient are either both positive or both negative.

11. A circuit comprising:
a MOSFET having an input terminal directly or indirectly coupled to a direct current input voltage;
a transistor coupled to the MOSFET, and configured to cause an impedance of the MOSFET to increase in response to a base-to-emitter voltage of the transistor exceeding a threshold voltage, wherein the threshold voltage increases as temperature decreases and is a low voltage relative to the direct current input voltage;
a component electrically coupled either directly or indirectly to the base of the transistor and to the emitter of the transistor, wherein the base-to-emitter voltage comprises a voltage drop across the component, the voltage drop across the component to increase as temperature decreases;
wherein the sensed voltage comprises the voltage drop of the component and a voltage drop over a resistive element, the voltage drop of the resistive element to be a function of a current of the direct current input voltage.

12. The circuit of claim 11, wherein the component is a Schottky diode.

13. The circuit of claim 11, wherein the component is connected in series to a resistor, and the base-to-emitter voltage comprises a voltage drop across the resistor.

14. The circuit of claim 11, the threshold voltage of the transistor has a first temperature coefficient and the component has a second temperature coefficient, and wherein the first temperature coefficient and second temperature coefficient are either both positive or both negative.

15. A power converter circuit comprising:
inputs configured to connect to a power source, wherein a current of greater than 4 amps is drawn from the power source during steady state operation;
an inrush current suppression circuit configured to limit inrush current to less than 9 amps in response to a line transient condition at the power source having a slew rate of 20 V/μs, the inrush current suppression circuitry to limit inrush current to less than 9 amps when operating at −45° C. and 95° C.;
wherein the inrush current suppression circuit comprises a metal-oxide semiconductor field-effect transistor (MOSFET) having an input terminal directly or indirectly electrically coupled to a direct current input voltage of the power source; a transistor electrically coupled to the MOSFET and configured to cause an impedance of the MOSFET to increase in response to a sensed voltage exceeding a threshold voltage, the sensed voltage to increase in response to a rapid increase in the direct current input voltage; a component electrically coupled to the transistor, the component to have a voltage drop that varies as a function of temperature;
wherein the threshold voltage is a low voltage relative to the direct current input voltage.

16. The power converter circuit of claim 15, wherein the component is a Schottky diode.

17. The power converter circuit of claim 15, wherein the component is connected in series to a resistor, and the base-to-emitter voltage comprises a voltage drop across the resistor.

* * * * *